United States Patent [19]

Quiroga

[11] 4,243,006
[45] Jan. 6, 1981

[54] ROTARY ENGINE WITH LATERAL PISTONS

[76] Inventor: Pascual A. Quiroga, Cordoba 1080, 1 piso, 2000 Rosario, Sante Fe, Argentina

[21] Appl. No.: 944,973

[22] Filed: Sep. 22, 1978

[30] Foreign Application Priority Data

Nov. 16, 1977 [AR] Argentina .............................. 270002

[51] Int. Cl.³ ........................................... F02B 53/00
[52] U.S. Cl. ..................................... 123/247; 418/260
[58] Field of Search ............... 123/247, 122 C, 122 F; 418/143, 260, 263, 264

[56] References Cited

U.S. PATENT DOCUMENTS

| | | | |
|---|---|---|---|
| 1,269,937 | 6/1918 | Hutsell | 418/82 |
| 2,224,443 | 12/1940 | Maurer et al. | 123/247 X |
| 2,338,112 | 1/1944 | Hell | 418/263 X |
| 3,568,645 | 3/1971 | Grimm | 418/264 |
| 4,133,618 | 1/1979 | Smolinski | 418/258 |

FOREIGN PATENT DOCUMENTS

| | | | |
|---|---|---|---|
| 447221 | 7/1927 | Fed. Rep. of Germany | 418/143 |
| 360024 | 2/1906 | France | 418/263 |

*Primary Examiner*—Michael Koczo
*Attorney, Agent, or Firm*—Abraham A. Saffitz

[57] ABSTRACT

A rotary internal combustion engine fitted with ignition means for the fuel air mixture delivered to the cylinders comprising a rotor having an output rotor shaft, a housing forming the outer shell of the engine which is fitted with intake and exhaust openings for fuel and exhaust gases, the openings located in the outer periphery of the housing wherein the rotor housing comprises a rotatable support for the motor shaft and includes an irregularly shaped cavity which surrounds the periphery of the rotor. A plurality of radially disposed vanes are mounted in the rotor for radial reciprocating movement relative to the axis of rotation of the rotor. Novel interconnecting cam means are provided between the outer shell of the housing and the vanes to initially actuate the vanes radially outwardly upon rotation of the rotor to positively position and maintain the outer ends of the vanes in close operative proximity to the inner peripheral surface of the irregularly shaped cavity. A new spring means under tension is connected between each vane and the rotor which urges the rotor radially upwardly and opposite to the force of the interconnecting means which actuates and urges the vane outwardly.

3 Claims, 5 Drawing Figures

ROTARY ENGINE WITH LATERAL PISTONS

BACKGROUND OF THE INVENTION

1. Field of the Invention

The invention is in the field of rotary expansible chamber devices which are provided with positively actuated vanes and are cam actuated with a spring bias means to operate a vane return force in a direction opposite to the movement of the cam. In the type of device to which the invention pertains, rollers are provided.

2. Description of the Prior Art

In Hutsell, U.S. Pat. No. 1,269,937, granted June 18, 1918, there is disclosed a rotary internal combustion engine having a rotor housing of irregular shape in one embodiment and of irregular shape in another embodiment with radially movable vanes or blades, ignition means for explosive charge intake, fuel intake port, exhaust port and a self-circulating lubricating system. The springs 19 of the power vanes tension the vanes in an outward direction (see page 1, column 2, lines 93–105) while the cam, cam rollers and grooves guide the blades in the opposite direction. The sealing means provided in the irregularly shaped embodiment are packing strips 31 (see page 2, lines 32–47) between the rotor and shoulders of the casing, but these must be augmented with forked spring packing as shown in FIG. 6. This construction of packing in FIG. 6 in Hutsell is not suitable for an irregularly shaped shell housing which provides a totally different structure and operation in the present invention.

In Maurer et al, U.S. Pat. No. 2,224,443, granted Apr. 27, 1940, a comparable cam and roller construction is shown as in Hutsell but the spring operation is entirely different than in the present invention, the spring being under compression to force the vane outwardly (see page 1, column 2, lines 54–55).

In Grimm, U.S. Pat. No. 3,568,645, granted Mar. 9, 1971, the shape of the housing is like that in Hutsell, FIG. 1, and a special oval shaped cavity is provided, enlongated at the two diametrically opposite ends. The sealing means are different.

OBJECT OF THE INVENTION

It is an object of the invention to provide a rotary internal combustion engine with novel oppositely directed cam actuator and spring bias forces wherein the spring means is under tension only to urge the vane radially downwardly and opposite to the force of the cam which urges the vane outwardly and upwardly toward the periphery of the rotor.

A further object of the invention is to provide a novel rotor housing having an irregularly shaped cavity to surround the periphery of the rotor and which housing has an outer surface which is substantially cylindrical making manufacture less costly and operation more efficient.

Another object of the invention is to provide novel sealing means which are formed of appropriate metal which meets the temperature operating requirement of the engine and are located at the piston sealing end of the rotor away from the vane to piston connection. The pistons are also provided with sweeping piston rings to provide improved lateral locking of the expansion chamber to produce improved oil flow operation, promote efficiency in operation and assure a hermetic seal.

SUMMARY OF THE INVENTION

To meet the above objects the invention provides a rotary internal combustion engine fitted with ignition means for the fuel air mixture delivered to the cylinders comprising a rotor having an output rotor shaft, a housing forming the outer shell of the engine which is fitted with intake and exhaust openings for fuel and exhaust gases, the openings located in the outer periphery of the housing.

The rotor housing comprises a rotatable support for the motor shaft and includes an irregularly shaped cavity which surrounds the periphery of the rotor. A plurality of radially disposed vanes are mounted in the rotor for radial reciprocating movement relative to the axis of rotation of the rotor.

Novel interconnecting cam means are provided between the outer shell of the housing and the vanes to initially actuate the vanes radially outwardly upon rotation of the rotor to positively position and maintain the outer ends of the vanes in close operative proximity to the inner peripheral surface of the irregularly shaped cavity.

A new spring means under tension is connected between each vane and the rotor which urges the rotor radially upwardly and opposite to the force of the interconnecting means which actuates and urges the vane outwardly.

A distinguishing feature of the chamber of this motor is that it is formed in a hollow cylindrical cavity of the rotor. The limited longitudinal movement of the vane and attached piston within the cavity or cylinder permits angular movement relative to the vertical axis of the rotary motor.

The vane and piston move with the cylinder by means of guides. The compression mixture is compressed before it enters the combustion chamber and the feed of gases is controlled by means of valves which allow the gases to enter the chamber at the moment this chamber begins to expand.

The spark plug ignition is synchronized with the rotation of the rotor to produce ignition of the mixture that has entered the chamber. Thus, for each chamber there is a spark plug near the entrance of the combustion mixture as well as an exhaust port.

The engine may also operate with a fuel mixture under pressure in which ignition of the mixture is enhanced by means of a pump or fuel injection means together with pre-heating of the fuel.

DESCRIPTION OF THE PREFERRED EMBODIMENT

Figure 1:
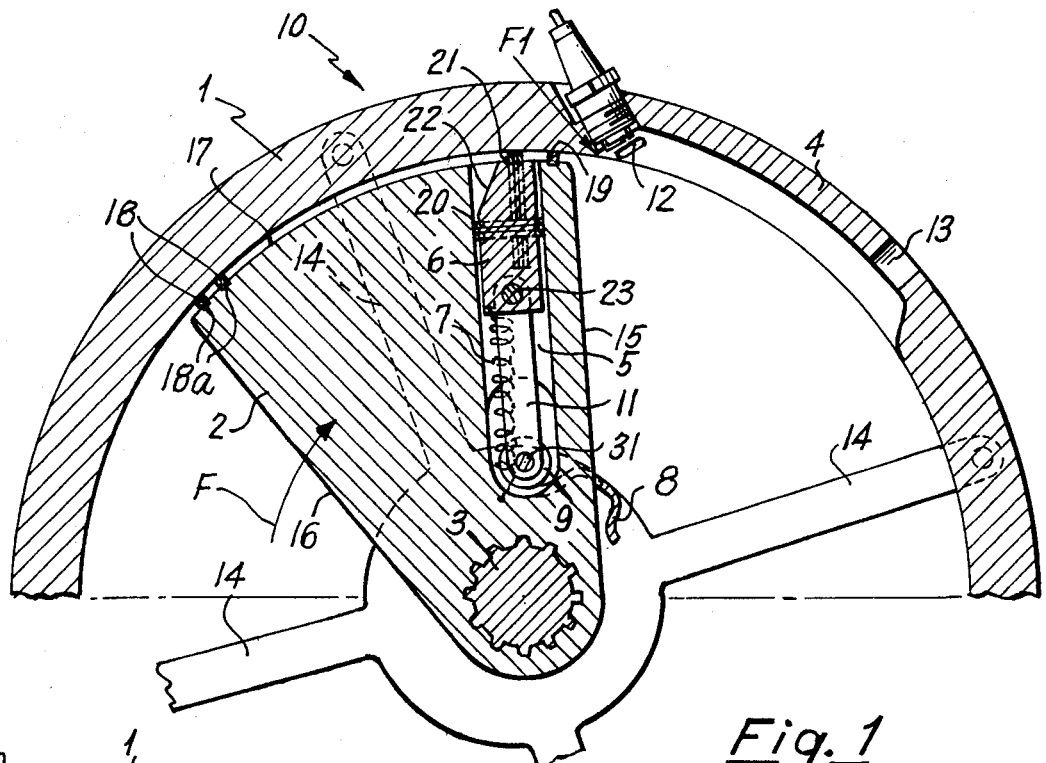
FIG. 1 is a fragmentary sectional view of parts cut away illustrating the general arrangement of vane and piston parts in the expansible chamber of the rotor and the inner irregular configuration of the housing.

FIG. 1 illustrates the rotary engine of the invention in sectional view with some parts cut away to show the cylindrically shaped housing 1 fitted with the rotor 2 having a plurality of axial chambers 5 in which pistons 6 are connected to vanes or rods 11 for reciprocating movement of the pistons and vanes in the axial chamber. The output of the radial reciprocating motion of the piston and vane is delivered to a single output rotor shaft.

Each of the pistons 6 is provided with a transverse piston pin 23 located at the inner base of the piston for connecting the piston 6 to the vane 11 at the top of the vane. The connecting of the vane to the bottom of the axial chamber 5 is by means of cam pin 31, this cam pin being a part of the cam means interconnected between the outer housing 1 and the axial chamber 5 to provide the positive cam actuation of the vanes in a direction radially outwardly upon rotation of the rotor.

Figure 2:
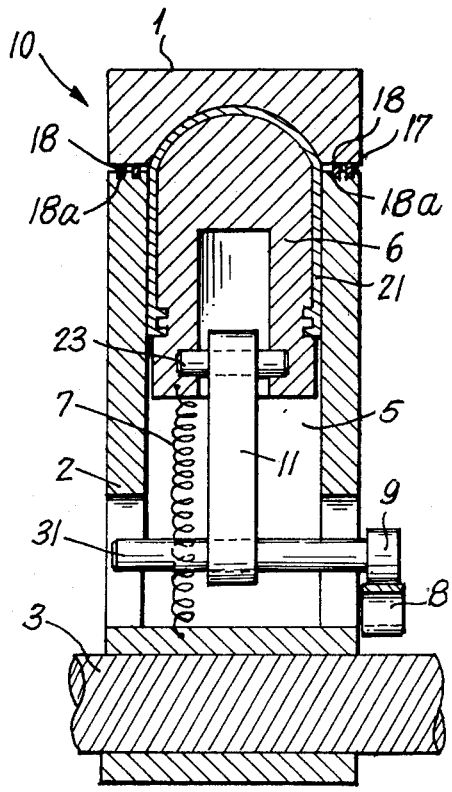
FIG. 2 is an enlarged sectional view through the rotor of the embodiment of FIG. 1 which illustrates the unique details of the opposite forces of the tension spring mounting and the cam and roller operation for the reciprocal movement of the vanes.

A cam means 8 is best shown in two views, one the cut away view of FIG. 1 and the other in the enlarged sectional view as presented in FIG. 2. The sinuous shape cam guide 8, shown in FIG. 1, bears against cam followers 9 as shown in FIGS. 1 and 2 to provide a positive reciprocating motion of the vane 11 and piston 6 whereby the pistons are always urged radially outwardly upon rotation of the rotor under the positive cam action of rollers 9 and guides 8 which are positioned in the critical location shown in FIG. 1.

In the opposite direction to this cam directed outward movement of the pistons 6 and vanes 11 the sole pulling force which occurs in the absence of an explosive charge of fuel is the tension force of tension spring 7 which, as shown in FIG. 2, has the upper end of the spring fixedly secured to the bottom of the piston 6, thereby pulling piston and vane downwardly with the spring 7 having its bottom end firmly fixed to the bottom of the axial chamber 5.

The unique yet simple combination of upward cam forces and downward tensioned spring pulling forces takes advantage of the outstanding tensile strength properties of spring steels. Springs made from these steels may be flexed in tensions hundred of thousands and millions of cycles without encountering metal failure, whereas compression springs, when flexed under heavy load conditions, fail relatively quickly. This failure under compression is believed to be due to the inherent recrystallizing properties of metal. Recrystallization is accelerated under repetitive working forces and under the high temperature conditions which are encountered during normal operation of the engine. The repeated forces cause failure by fatigue which is entirely different in kind in the use of the compression spring to push the piston and vane downwardly.

Figure 3:
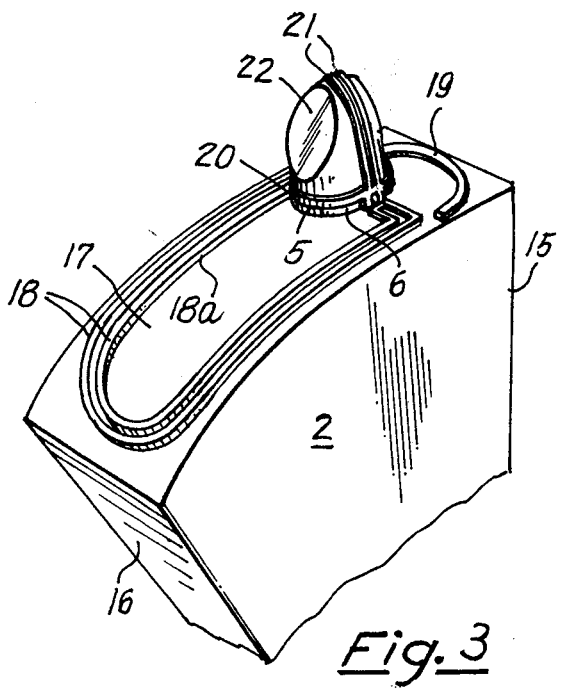
FIG. 3 is a fragmentary perspective view of the upper part of the rotor and chamber illustrating the novel sealing construction at the piston head.

The preferred embodiment of sealing metal body 17 in FIG. 3 for the top of the chamber consists of cast iron which is heat resistant, expands uniformly under high temperature, withstands the high pressures which are attained in the explosion of the fuel by the igniting means and can be machined very precisely to hold the piston sealing rings between the grooves 2 to 5 millimeters deep cut out in the cast iron which form the gas tight bearing surface between the bearing face of the rotor 2 and the housing 1.

As shown in FIG. 2, the edges of the sealing metal body are in the form of a double groove 18a formed with shallow valleys of rectangular cross section about 2 to 3 millimeters wide (up to 6 millimeters) and about 2 to 6 millimeters high for receiving and sealing the thin rings 18 which have the same elongated elliptical periphery as in the double grooves of the sealing body 17.

In comparison with Hutsell, U.S. Pat. No. 1,269,937, the elliptically shaped sealing edges with serpentine groove configuration of seal 17 in the present invention provides a totally different construction than the bearing shoulder 28 of the casing in Hutsell, face 15 of the rotor and forked spring packing 36 in grooves 35. The new seal 17 in the construction of the present invention is based partly upon the better performance at lower cost which is afforded to the regular circular cylindrical outer configuration of the housing 1 and the irregularly shaped cavity of the inner surface of the housing 1 as shown in FIG. 1 herein. The irregularly shaped cavity of the housing provides a segmented inner chamber 4 of the housing having an inlet port 12 at the front end thereof, using the arrow F as the reference for front, and an outlet port 13 which extends through the wall of the housing at the other end of the irregularly shaped cavity. The housing thickness surrounding the cavity is proportioned to withstand the high temperatures and pressures encountered as a result of the combustion forces in the axial chamber while the combustion products exit from the outlet port 13.

This relationship of inner housing chamber 4, inlet port 12, outlet port 13 and sealing body 17 with elliptical serpentine edges and grooves for the sealing rings permits more efficient operation and more economical construction for the close packing function under oil lubrication between the rotor 2 and the housing 1 in the present invention than in Hutsell, U.S. Pat. No. 1,269,937. Like Hutsell, the oil lubrication of the mechanism is provided by bringing oil into a channel of the rotor. The circular oil channel of the rotor is located near the common shaft in much the same manner as shown in FIG. 2 of Hutsell. The passageway continues to feed oil to the axial chambers 5 for lubricating the vanes or rods 11 and the lubrication operation is again similar to that described in Hutsell.

The gas or explosive charge comes into the inlet port 12 of the inner segmented chamber 4 of the housing 1 through a line marked F1 on FIG. 1 and provides a proper mixture of air and fuel to be ignited by an ignition means, such as a spark plug (not shown). The spark plug is located with the ignition portion of the plug located at the end of the arrow head F1 in FIG. 1. This indicates schematically that ignition occurs at the first clearance point during rotation of rotor 2 in housing 1 as shown by the arrow F at the very beginning of the chamber segment 4 in the inner housing. The synchronization with the cam movement can be seen from tracing the movement along the sinuous path of the cam guide 8, this cam movement bringing the piston 6 and the vane 11 into the smallest free volume condition at the top or outermost reach of the piston position and the spring action pulling in the opposite direction occurs immediately thereafter.

In the embodiment illustrated in FIGS. 1, 2 and 3 the upper truncated portion defining the shape of the piston bears the reference numeral 22 and the projection of the upper portion, somewhat exaggerated, is shown in FIG. 3 at a stage beyond ignition to indicate that the piston has come upwardly into the recess near 12 and after explosion in segment 4 will then undergo the retraction downwardly under tensioning spring pressure while under positive engagement with the trough of the cam guide 8, at the same time maintaining a proper oil seal under the sweeping action of the rotor. This FIG. 1, 2 and 3 embodiment further illustrates the case for a cylindrical angular rotor of a pie shaped sector in which three rotors are mounted on a common shaft, each 120 degrees apart from the other.

Figure 4:
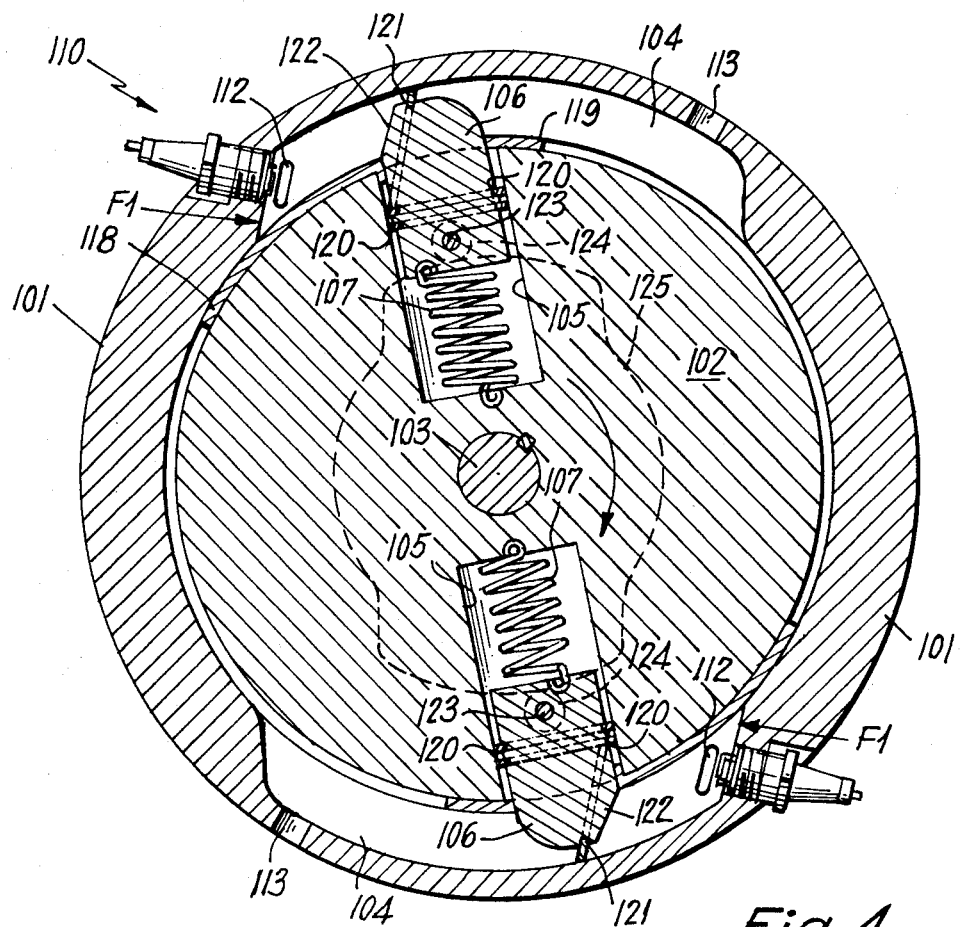
FIG. 4 is a sectional view of a modification of the rotary engine.

Although the rotary engine of the invention can obviously be used for only two rotors in opposite or 180 degree configuration, as shown in detail in FIG. 4, wherein the elements of FIGS. 1, 2 and 3 are indicated by the same reference characters in the hundred numerical series the most practical embodiments have three rotor segments spaced apart at 120 degrees, four rotor segments spaced apart at 90 degrees, six rotor segments spaced apart at 60 degrees and twelve rotor segments spaced apart at 30 degrees.

In FIG. 4 there is illustrated the special case of opposite rotor segments and the general proportions of the two segmented inner chambers 104 of the housing 161 can be more precisely ascertained to permit the castings of the housing and the rotor to be made to provide a highly efficient two piston rotor engine. For certain small jobs these two piston engines are low in cost, high in output and very easy to maintain and repair.

Greater energy output and higher efficiency are achieved with the three and four piston engines.

Figure 5:
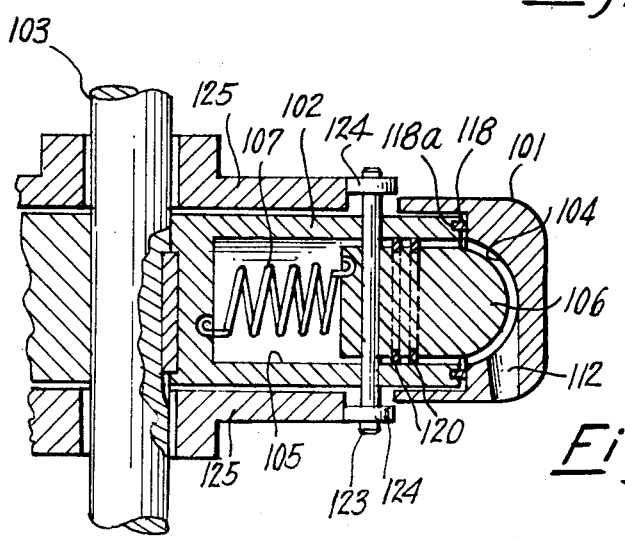
FIG. 5 is an enlarged fragmentary sectional view of the sealing rings for the front and back of the piston in the oil sweeping circuit traversed by these piston rings.

A preferred form of piston 106 to bring a trailing bearing surface against the inner cavity 104 is illustrated in FIGS. 4 and 5. This trailing surface 122 is convex and bears against concave inner surface of the segment chamber 104.

To facilitate mounting of the rotary engine 10 and 100 in a power transmitting mode via the output shaft 3 and 103, a mounting frame 14 and 14 holds the shaft 3 and 103 in proper position relative to the housing 1 and 101 and rotor 2 and 102.

From the above description of FIGS. 1, 2 and 3 it can be seen that the engine of the present invention may be used in forms varying from a one piston engine as illustrated in FIG. 1, a two piston engine as illustrated in FIG. 4, or any variations from one to 12 or more pistons as already described. In the case of a one piston engine the forward face of the rotor is substantially perpendicular to the housing as shown by face 15 and 115, at an angle of 75 to 100 degrees, and the rear or trailing face 16 and 116 of rotor 2 and 102 is at a trailing angle relative to the perpendicular of about 30 to 85 degrees.

Obviously it is necessary to maintain a tight fit in proper oil sealed relation between rotor 2 and 102 and the inner surface of the housing 1 and 101 which must take into account both the trailing face 16 and 116 of the rotor and to this end the placement of the sealing rings 18 and 118 as shown nearer the trailing edge. This trailing edge can be seen immediately next to reference numeral 18 and the lead line in FIG. 1 to show the preferred location. Also note that this trailing edge is illustrated in FIG. 3 near the lead line to reference numeral 18.

The wiping seal 19 in FIG. 3 and 119 in FIG. 4 wipes away oil which accumulates during rotation of the rotor.

The conventional bottom piston rings 20 and 120 are shown in FIGS. 1 and 4 and together with seals 21 and 121 respectively aid in maintaining the proper pressure. Also conventional cams 25 and 125 and cam followers 24 and 124 permit the efficient operation of the reciprocating machine.

Having thus disclosed the invention, I now claim:

1. A rotary internal combustion engine comprising a rotor having a plurality of radial chambers and an output rotor shaft:
    a housing having an intake and exhaust opening in the outer periphery of said housing forming an outer shell rotatably supporting said rotor shaft;
    said housing having an irregularly shaped cavity around the periphery of said rotor;
    a plurality of radially disposed vanes, each mounted in one of the chambers of said rotor for radial reciprocating movement relative to the axis of rotation of said rotor;
    an ignition means in said housing for igniting an explosive charge of fuel and air in said chamber;
    means for supplying an explosive charge of fuel and air under pressure to said chamber;
    a plurality of corresponding pistons each connected to one of said vanes for reciprocating movement in said radial chambers responsive to said explosive charge under a compression condition in the chamber of fuel and air through the intake of said chamber in the presence of said ignition means;
    cam means interconnected between said outer shell and said vanes to initially actuate the vanes and pistons radially outwardly upon rotation of the rotor to positively maintain the positioning of the outer ends of said pistons in close proximity to the peripheral surface of said irregularly shaped cavity; and
    each of said vanes having a spring under tension biasing the vane against the cam means for actuating the vane outwardly, said tension spring responding immediately to the explosive force of the ignition charge which moves the piston inwardly.

2. A rotary internal combustion engine comprising a rotor having a plurality of radial chambers, an intake to said chambers and an output rotor shaft;
    a housing having an intake and exhaust opening in the outer periphery of said housing forming an outer shell rotatably supporting said rotor shaft;
    said housing having an irregularly shaped cavity around the periphery of said rotor;
    a plurality of radially disposed vanes, each mounted in one of the chambers of said rotor, for radial reciprocating movement relative to the axis of rotation of said rotor and each vane having a spring under tension connected thereto;
    an ignition means in said housing for igniting an explosive charge of fuel and air in said chamber;
    means for supplying an explosive charge of fuel and air under a compression condition to said chamber;
    a plurality of corresponding pistons, each connected to one of said vanes, for reciprocating movement in said radial chambers responsive to said explosive charge under a compression condition in the chamber of fuel and air through the intake of said rotor in the presence of said ignition means; and
    cam means for radially actuating the vanes including a cam guide and a pair of cam followers mounted on the inner ends of said vanes operatively engaging the cam guide to force the vanes outwardly against the action of the springs connected to said vanes.

3. A rotary internal combustion engine as claimed in claim 2, wherein said rotor is provided with an elongated elliptical piston sealing means about the edge of the rotor chamber including thin metallic piston rings which together provide a temperature resistant oil lubricated seal for the piston, the elongated piston sealing means being formed with a plurality of grooves into which the thin rings are seated in which the metallic rings expand on heating to maintain a hermetic seal by said sealing means for the chamber.

* * * * *